(12) United States Patent
Oyama

(10) Patent No.: US 7,888,430 B2
(45) Date of Patent: Feb. 15, 2011

(54) MODIFIED POWDER, FLUID COMPOSITION CONTAINING SAID MODIFIED POWDER, FORMED ARTICLE, AND METHOD FOR PRODUCING MODIFIED POWDER

(75) Inventor: Shigeru Oyama, Sodegaura (JP)

(73) Assignee: Idemitsu Technofine Co., Ltd., Tokyo (JP)

( * ) Notice: Subject to any disclaimer, the term of this patent is extended or adjusted under 35 U.S.C. 154(b) by 917 days.

(21) Appl. No.: 11/573,515

(22) PCT Filed: Aug. 3, 2005

(86) PCT No.: PCT/JP2005/014182

§ 371 (c)(1),
(2), (4) Date: Feb. 9, 2007

(87) PCT Pub. No.: WO2006/016506

PCT Pub. Date: Feb. 16, 2006

(65) Prior Publication Data

US 2008/0214786 A1    Sep. 4, 2008

(30) Foreign Application Priority Data

Aug. 10, 2004  (JP) .............................. 2004-233838
Aug. 10, 2004  (JP) .............................. 2004-233839

(51) Int. Cl.
*C08F 16/06* (2006.01)
*A61K 38/17* (2006.01)

(52) U.S. Cl. ........................................ 525/56; 530/353

(58) Field of Classification Search .................... 525/56
See application file for complete search history.

(56) References Cited

U.S. PATENT DOCUMENTS 5,718,954 A * 2/1998 Sano et al. .................. 428/35.6
5,811,024 A   9/1998 Taguchi et al.

FOREIGN PATENT DOCUMENTS

| EP | 1650772 A1 | 4/2006 |
|----|------------|--------|
| JP | 06-339924 A | 12/1994 |
| JP | 07-292306 A | 11/1995 |
| JP | 09-099251 A | 4/1997 |
| JP | 2002-108092 A | 4/2002 |
| JP | 2003-210118 A | 7/2003 |
| WO | 02-099823 A1 | 12/2002 |
| WO | 2005-013293 A1 | 2/2005 |

OTHER PUBLICATIONS

Patent Abstracts of Japan publication No. 09-099251, Apr. 15, 1997; Japanese application No. 07-257639 filed Oct. 4, 1995.
Patent Abstracts of Japan publication No. 6-339924, Dec. 13, 1994; Japanese application No. 05-131926, filed Jun. 2, 1993.
Patent Abstracts of Japan publication No. 07-292306, Nov. 7, 1995; Japanese application No. 06-084412 filed Apr. 22, 1994.
Patent Abstracts of Japan publication No. 2002-108092, Apr. 10, 2002; Japanese application No. 2000-302505 filed Oct. 2, 2000.

* cited by examiner

*Primary Examiner*—Ling-Siu Choi
*Assistant Examiner*—Hui Chin
(74) *Attorney, Agent, or Firm*—Mullen, White, Zelano, Branigan, P.C.

(57) ABSTRACT

The modifying powder is silk powder having an average particle diameter of 10 μm or less, oil absorption of 130 ml/100 g or less and particle diameter of 80 μm or less on the basis of dispersion degree evaluation with a grind gauge according to JIS K5400; or polysaccharide powder having an average particle diameter of 10 μm or less, and ink viscosity of less than 15 Pa·s or oil absorption of 85 ml/100 g or less. Such modifying powders can be obtained through a method comprising a first pulverization process for pulverizing a starting material for modifying material using a dry-type mechanical pulverizer such as a ball mill, and a second pulverization process for pulverizing the obtained pulverized product with a jet mill to fine particles having an average particle diameter of 10 μm or less, wherein pulverization treatment time in the first pulverization process is determined to be 40 hours or more.

19 Claims, No Drawings

MODIFIED POWDER, FLUID COMPOSITION CONTAINING SAID MODIFIED POWDER, FORMED ARTICLE, AND METHOD FOR PRODUCING MODIFIED POWDER

TECHNICAL FIELD

The present invention relates to modifying powder, liquid compositions and molded products containing the modifying powder, and a method for producing the modifying powder.

BACKGROUND ART

Conventionally, in various products such as paint, ink, fiber treatment agents, rubber, plastic molded products, synthetic leather and fiber, improvement of various properties has been conducted by adding a specific modifying material.

In order to add such modifying material to a product, a material prepared by pulverizing starting material of a modifying material to form modifying powder is used.

As such modifying powder, silk powder (powdery silk) such as powder of silk fibroin (silk fibroin powder) is utilized. By adding such silk powder, it is possible to provide a product with various properties such as silk-specific feeling, ink-accepted property and moisture absorbability/releasability. As for such products, for example, silk fibroin powder-containing artificial leather, which is produced by incorporating silk fibroin powder in synthetic resin, and the like are known.

Various production methods have been proposed for obtaining such silk powder. However, for example, when a composition prepared by compounding a silk powder to synthetic resin, or an aqueous or solvent-based liquid medium constituting ink or paint is made into a commercial product for industrial applications, control of the powder properties is required because dispersibility into thermosetting resin or dispersibility into a solvent-based or aqueous liquid medium is determined to be important. In order to control such properties, a method for obtaining powder of silk fibroin has been employed in which silk fibroin to be a silk starting material is subjected to a chemical treatment, heating/pressurizing treatment or the like. However, there are such problems that dispersibility of the obtained powder of silk fibroin is insufficient, and that the silk-specific feeling and the like can not be maintained. Accordingly, in these years, studies have been proceeded while giving attention to control the average particle diameter of silk powder to be obtained through a pulverization treatment such as a mill.

For obtaining powder of silk such as silk fibroin, using a ball mill or a jet mill is known.

However, when silk fibroin is pulverized with a ball mill, since it is necessary to change a ball mill sequentially from that with a large diameter to that with a small diameter in order to produce powder having an average particle diameter of 10 μm or less, there are such problems that pulverization time becomes very long and, in addition, the powder may color.

Also, when silk fibroin is pulverized with a jet mill, since shape of the pulverized product becomes fibrous, there is such a problem that compounding of the product to a solvent-based resin solution or an aqueous resin solution leads to increase in viscosity thereof; thereby resulting in difficulty of compounding. As described above, since powder of silk fibroin obtained by such single mechanical pulverization includes particles with irregular sizes, there is such a problem that powder of silk fibroin having a uniform size can not be obtained.

On the contrary, as a method for obtaining powder of silk fibroin suitable for a modifying material, there is provided a method for obtaining silk fibroin fine powder having an average particle diameter of 10 μm or less, for example, by pulverizing silk fibroin with a multistage pulverization method (for example, Patent Document 1). According to the production method, silk fibroin fine powder is obtained by employing a ball mill as a second stage pulverizer while determining the pulverization treatment time to be 20 hours or less, by employing a jet mill as a third stage pulverizer, and by conducting β-modification treatment during or after the pulverization treatment.

On the other hand, as modifying powder, polysaccharide powder (powdery polysaccharide) represented by cellulose powder originating from pulp is utilized. Addition of such polysaccharide powder gives various products in which various properties such as ink-accepted property and moisture absorbability/releasability are created or improved, and the product is used in various fields such as cosmetic, healthy foods and a filler for various synthetic resin products.

Various production methods have been proposed for obtaining such polysaccharide powder. However, for example, when a composition prepared by compounding a silk powder to synthetic resin, or an aqueous or solvent-based liquid medium constituting ink or paint is made into a commercial product for industrial applications, control of the powder properties is required because dispersibility into thermosetting resin or dispersibility into a solvent-based or aqueous liquid medium is determined to be important. Accordingly, studies have been proceeded while giving attention, in particular, to control the average particle diameter of polysaccharide powder.

For obtaining powder of polysaccharide such as cellulose, usage of a ball mill or a jet mill is known. However, also in such pulverization of cellulose and the like, there are problems similar to those in pulverization for obtaining silk powder described above.

On the contrary, for obtaining polysaccharide powder suitable for a modifying material, a method for producing polysaccharide powder is provided in which, for example, a first pulverization process is conducted to pulverize polysaccharide or the like using a rolling ball mill or the like within 20 hours, and then a second pulverization process is conducted to pulverize the pulverized product in the first process using a jet mill (for example, Patent Document 2).

[Patent Document 1] Japanese Patent Application Laid-Open No. 6-339924 ([Claim 1], [0012])

[Patent Document 2] Japanese Patent Application Laid-open No. 9-99251 ([Claim 1], [0023])

DISCLOSURE OF THE INVENTION

Problems to be Solved by the Invention

However, although the fine powder of silk fibroin (silk powder) obtained through the method disclosed in Patent Document 1 achieves to control the average particle diameter thereof to be 10 μm or less, compounding of the fine powder to a resin solution at a high ratio results in increase of viscosity and, in particular, application of it in combination of another filler such as ink or a surface treatment agent sometimes does not allow various properties belonging to the silk fibroin fine powder to be exerted sufficiently. In addition, a too high viscosity of a compounded resin solution or the like generates such problems that good droplets can not be formed in the case of spray coating to result in poor appearance of coated surface, and that sufficient ink absorbability is not exerted in the field of writing receptive ink. For example, a gravure coating method and the like are mainly used in the surface treatment field such as paint, but leveling property thereof degrades not to give good coated surface, and thus improvement is required.

On the other hand, although the organic fine particles obtained through the method disclosed in Patent Document 2 achieves to control the average particle diameter thereof to be 10 μm or less, compounding of the polysaccharide powder to a resin solution at a high ratio results in increase of viscosity and, in particular, application of it in combination of another filler such as ink or a surface treatment agent sometimes does not allow various properties belonging to the polysaccharide powder to be exerted sufficiently. In addition, a too high viscosity of a compounded resin solution or the like generates such problems that good droplets can not be formed in the case of spray coating to result in poor appearance of coated surface, and that sufficient ink absorbability is not exerted in the field of writing receptive ink. For example, a gravure coating method and the like are mainly used in the surface treatment field such as paint, but leveling property thereof degrades not to give good coated surface, and thus improvement is required.

Therefore, an object of the invention is to provide polysaccharide powder having excellent dispersibility for resin materials for molding and processing and a resin solution to be a base material of an aqueous or solvent-based liquid composition constituting ink, paint or the like to allow the powder to be compounded in a high content, liquid compositions and molded products containing the polysaccharide powder, and a method for producing the polysaccharide powder.

Therefore, an object of the invention is to provide modifying powder having excellent dispersibility for resin materials for molding and processing and a resin solution to be a base material of an aqueous or solvent-based liquid composition constituting ink, paint or the like to allow the powder to be compounded in a high content, liquid compositions and molded products containing the modifying powder, and a method for producing the modifying powder.

Means for Solving the Problems

The modifying powder of the present invention is powder (silk powder) obtained by dry-pulverizing a silk starting material, which is characterized by having an average particle diameter of 10 μm or less, oil absorption of 130 ml/100 g or less, and particle diameter of 80 μm or less on the basis of dispersion degree evaluation with a grind gauge according to JIS K5400.

The modifying powder of the invention has a silk-specific feeling, and has excellent dispersibility for a resin material for molding and a resin solution to be a base material for a liquid composition constituting paint or the like, thereby making it possible to be compounded in such liquid compositions and molded products in a high content.

Accordingly, for example, even when the modifying powder is added to ink, it can be incorporated to an ink base material in a high content, therefore it becomes possible to provide an ink having an excellent ink-accepted property as well as a silk-specific feeling.

With regard to the modifying powder of the invention, preferably the aforementioned silk starting material is silk fibroin, whereby silk fibroin powder that exerts the aforementioned effects can suitably be obtained.

Further, it is preferred that the modifying powder of the invention has the oil absorption of 60-100 ml/100 g and the particle diameter of 20-70 μm on the basis of dispersion degree evaluation with a grind gauge according to JIS K5400, because the aforementioned effects are exerted more surely.

In addition, a liquid composition containing the modifying powder of the invention and a molded product made of a resin material and/or elastomer containing the modifying powder of the invention can disperse suitably the modifying powder originating from silk and contain it in a high concentration, thereby making it possible, while having effects such as a silk-specific feeling exerted by the modifying powder of the invention, to improve ink-accepted property when the powder is compounded to ink and feeling of leather when it is compounded as a surface treatment agent of leather, and to impart touch feeling and hygroscopicity resembling to natural leather when it is compounded in a urethane layer of synthetic leather, and making it possible to provide such liquid compositions and molded products that can exert effectively such various properties.

The modifying powder of the invention is powder (first polysaccharide powder) obtained by dry-pulverizing polysaccharide, which is characterized by having an average particle diameter of 10 μm or less and ink viscosity of less than 15 Pa·s.

According to such invention, the powder has an excellent dispersibility for a resin material for molding and a resin solution to be a base material of a liquid composition constituting paint or the like, whereby it can be incorporated to such liquid compositions and molded products in a high content.

Therefore, even when the polysaccharide powder of the invention is added to ink, the powder can be incorporated to an ink base material in a high content, whereby it becomes possible to provide an ink having an excellent ink-accepted property.

Also, the modifying powder of the invention is powder prepared by pulverizing polysaccharide (a second polysaccharide powder) characterized by having an average particle diameter of 10 μm or less and oil absorption of 85 ml/100 g or less. Here, the second polysaccharide powder can enjoy the effects similar to those for the aforementioned first polysaccharide powder by defining the oil absorption within a certain range instead of the ink viscosity, compared with the case of the first polysaccharide powder.

In this connection, the modifying powder of the invention may have an ink viscosity of less than 15 Pa·s (the first polysaccharide powder) and, at the same time, an oil absorption of 85 ml/100 g or less (the second polysaccharide powder). Such constitution having conditions of both of them enables the aforementioned effects to be exerted maximally.

In the modifying powder of the invention, preferably polysaccharide is constituted of cellulose.

According to such invention, since type of polysaccharide which is the object to be pulverized is specified, it becomes possible to provide a cellulose powder that exerts the aforementioned effects.

Further, liquid compositions containing the modifying powder of the invention and molded products made of a resin material and/or elastomer containing the modifying powder of the invention can disperse suitably the modifying powder originating from polysaccharide and contain it in a high concentration, thereby making it possible to improve ink-accepted property when the powder is compounded to ink and feeling of leather when it is compounded as a surface treatment agent of leather, to impart touch feeling and hygroscopicity resembling to natural leather when it is compounded in a urethane layer of a synthetic leather, and to provide liquid compositions and molded products that can exert effectively such various properties.

The method for producing modifying powder according to the invention is characterized by comprising, in a method for producing modifying powder to obtain a modifying powder by pulverizing a starting material for the modifying material, a first pulverization process for pulverizing a starting material for modifying material using a dry-type mechanical pulverizer to give a pulverized product and a second pulverization process for pulverizing the pulverized product obtained in the first pulverization process with a jet mill to a fine powder having an average particle diameter of 10 μm or less, wherein the pulverization treatment time in the aforementioned first pulverization process is 40 hours or more.

The method for producing modifying powder according to the invention makes it possible to give, at the first pulverization process, sufficient impact force, compressive force and shear force to the starting material for the modifying material (silk starting material such as silk fibroin or polysaccharide such as cellulose), which is a product to be pulverized. Further, by pulverizing the obtained pulverized product in the second pulverization process again with a jet mill to fine particles having an average particle diameter of 10 μm or less, it becomes possible to force pulverized products themselves, and products to be pulverized and the jet mill wall, to collide sufficiently with each other. In this way, the modifying powder having been pulverized in a desired shape and size can be obtained efficiently.

In addition, since the pulverization treatment time in the first pulverization process is determined to be 40 hours or more, it becomes possible to obtain the modifying powder having aforementioned conditions suitable for the modifying powder of the invention originating from silk, that is, one having oil absorption and the particle diameter on the basis of dispersion degree evaluation with a grind gauge according to JIS K5400 (particle diameter based on a grind gauge) within a desired range (oil absorption: 130 ml/100 g or less, particle diameter based on a grind gauge: 80 μm or less) simply and efficiently.

Further, since the pulverization treatment time in the first pulverization process is determined to be 40 hours or more, it becomes possible to obtain the polysaccharide powder having aforementioned conditions suitable for the modifying powder of the invention originating from polysaccharide, that is, one having oil absorption and ink viscosity within a desired range (ink viscosity: less than 15 Pa·s, oil absorption: 85 ml/100 g or less) simply and efficiently.

In the method for producing a modifying powder according to the invention, use of a ball mill is preferred for the aforementioned dry-type pulverization treatment.

As for a ball mill, employment of a rolling ball mill is preferred in particular.

According to such invention, since a ball mill is employed as a dry-type mechanical pulverizer, impact force, compressive force, shear force and the like can be given efficiently to a silk starting material which is a product to be pulverized.

Further, use of a rolling ball mill as the ball mill makes mass production of the modifying powder possible and, at the same time, can inhibit coloring of the powder, suitably give the modifying powder in fine particles, which is preferred.

In the method for producing a modifying powder according to the invention, it is preferred that a silk starting material is used as a starting material of a modifying material, and that the average particle diameter or the average fiber length of the aforementioned silk starting material is 100 μm-5 mm before pulverization.

According to such invention, since the average particle diameter (in a shape of fiber, fiber length) of silk fibroin or the like which is the object to be pulverized is determined within a certain range, practice of simple pulverization treatment becomes possible and, at the same time, control of the average particle diameter of the obtained silk powder so as to be 10 μm or less can be conducted easily.

In the method for producing a modifying powder according to the invention, when a silk starting material is used as a starting material of a modifying material, β-modification treatment is preferably conducted during the first pulverization process and/or in a point after the first pulverization process and before the second pulverization process.

According to the invention, since β-modification treatment (treatment of dipping silk fibroin and the like in a predetermined treatment liquid to increase the percentage of β-structure thereof) is intended to be conducted during the first pulverization process in the two-step pulverization process or in a point after the first pulverization process and before the second pulverization process, the obtained silk powder has improved crystallinity and a lower oil absorption, whereby it becomes possible to disperse the silk powder uniformly in a solvent-based resin solution, aqueous resin solution and the like.

In the method for producing a modifying powder according to the invention, it is preferred that polysaccharide is used as a starting material of a modifying material, and that the average particle diameter of the polysaccharide to be pulverized is 20 μm-2 mm.

According to such invention, since the average particle diameter of polysaccharide which is the object to be pulverized is determined within a certain range, practice of simple pulverization treatment becomes possible and, at the same time, control of the average particle diameter of the obtained polysaccharide powder so as to be 10 μm or less can be conducted easily.

BEST MODE FOR CARRYING OUT THE INVENTION

First Embodiment

The modifying powder of the present embodiment is a silk powder obtained by using a predetermined silk starting material as a starting material of a modifying material and dry-pulverizing the same.

As for a silk starting material being the object to be pulverized, silk fibroin is used and, in particular, one containing silk fibroin in 80 mass % or more, preferably 90 mass % or more can be used. Here, silk fibroin (sometimes simply referred to as "fibroin") is a fibrous protein being a primary component of silk, and can be obtained simply by refining raw silk with hot water (or hot water containing an enzyme) to remove sericin.

There is no restriction on the shape of a silk starting material such as silk fibroin and a product in coarse particles can be used. When a product in coarse particles is used, preferably the average particle diameter or the average fiber length thereof is 100 μm-5 mm, and particularly preferably 100 μm-2 mm. The average particle diameter or the average fiber length of 100 μm-5 mm enables pulverization treatment to be practiced simply, and makes it easy to control an average particle diameter of silk powder obtained to be 10 μm or less.

In this connection, when silk fibroin in coarse particles is used as a silk starting material, for example, raw silk is dipped in hot water (or hot water containing an enzyme) to be refined to remove sericin, then the obtained silk fibroin which is fibrous protein is made into silk fibroin in coarse particles having an average particle diameter or an average fiber length of 100 μm-5 mm by means of predetermined pulverizer (for example, a rotating blade-type mill or a cutter blade-type mill), which can be used as a silk starting material.

Upon the refinement, refinement is preferably conducted so that silk fibroin is contained in 80 mass % or more, preferably 90 mass % or more.

For the silk powder of the invention, the silk starting material is pulverized so as to have an average particle diameter of 10 µm or less, preferably 2-8 µm. A silk powder having an average particle diameter larger than 10 µm may generate irregular coating, or cause, when it is used as a surface treatment agent for leather, remaining of gritty feeling on the surface, thereby becoming unsuitable for such application as a modifying material for ink, paint and the like.

In the silk powder of the invention, in addition to the aforementioned average particle diameter, oil absorption is 130 ml/100 g or less, preferably 60-100 ml/100 g, and particularly preferably 80-100 ml/100 g. When an oil absorption is larger than 130 ml/100 g, viscosity of ink, paint and the like containing the silk powder becomes high, making it not easy to coat the paint on a body to be coated. Considering utility as paint, it becomes difficult to incorporate the powder to them in a high content. On the other hand, if oil absorption is smaller than 60 ml/100 g, when the powder is incorporated in an aqueous or solvent-based resin material such as ink and paint, viscosity thereof becomes too small beyond necessity and, for example, there may be required such labor as adding a thickener separately.

As for the oil absorption of silk powder, for example, a value measured on the basis of JIS K5101 can be used.

In addition, the silk powder of the invention has a particle diameter of 80 µm or less on the basis of dispersion degree evaluation with a grind gauge according to JIS K5400 (hereinafter, sometimes simply referred to as "particle diameter based on a grind gauge"), and preferably the particle diameter is 20-70 µm. A particle diameter larger than 80 µm makes irregularity to coating (usually having a thickness of around 10 µm), easily leading to occurrence of defective appearance. Further, when the powder is used in surface treatment of leather, gritty feeling of the surface becomes strong, sometimes leading to degradation of sense of use.

On the other hand, when the particle diameter is less than 20 µm, it coagulates easily upon mixing it to resin, ink base material and paint base material, sometimes leading to difficulty of handling.

By controlling such particle diameter based on a grind gauge, presence of a small amount of large particles in powder (fine particles) can be eliminated, and control of the particle diameter becomes possible beyond a range in which the diameter can be controlled by specifying an average particle diameter.

In the silk powder of the invention, since the average particle diameter is determined to be 10 µm or less and, at the same time, the oil absorption and the particle diameter on the basis of dispersion degree evaluation with a grind gauge according to JIS K5400 are determined in a specific range of 130 ml/100 g or less and 80 µm or less respectively, the powder has good dispersibility for resin materials for molding and processing, and for resin solutions to be a base material of liquid composition constituting paint and the like, whereby the silk powder that may be compounded in a high content for these liquid compositions and molded products can be provided.

It is preferred that the silk powder of the present invention satisfies the requirements of average particle diameter, oil absorption, and particle diameter measured based on a dispersion degree evaluation with a grind gauge, and has water content of 3 wt % or less, preferably 2 wt % or less. Thus, when a resin composition containing the silk powder of the present invention is formed into a film by coating, foaming phenomenon (a defective phenomenon) can be prevented from occurrence.

Incidentally, film forming method by coating is a method in which paste-like compound, which is produced by mixing a resin powder of a resin such as vinyl chloride resin (PVC) and a plasticizer, is coated on a release paper by a coating device such as a knife coater; the resin powder is swelled by the plasticizer in a primary heating process so that the sol paste is gelated; and the gelated compound is melted to be formed into film in a secondary heating process. The coating device also can be of other type such as a comma coater, instead of a knife coater.

Different from other film-forming method such as calendar film-forming method and extrusion film forming method, since coating film-forming method has no heating/degasifying process, material having high hygroscopicity such as silk powder is difficult to use. Consequently the silk powder of the present invention has high practical value.

Accordingly, even when the silk powder of the invention is added to various products such as plastic molded products, synthetic leather, paint, ink, fiber, nonwoven fabric, woven or knitted fabric, fiber treatment agents and rubber, it may be incorporated to them in a high content while utilizing the characteristics of excellent dispersibility, whereby it becomes possible to give them various properties efficiently such as moisture absorbability/releasability, good touch feeling and antistatic property, as well as a silk-specific feeling, and to obtain simply products having been improved in these properties.

Further, in particular, the silk powder of the invention is excellent in dispersibility also for an aqueous or solvent-based liquid base material, therefore it enables effects to be exerted maximally when it is applied to these liquid base materials. For example, even when the silk powder is added to ink, it can be incorporated to a ink base material in a high content, therefore a ink, which is excellent in ink-accepted property and good touch feeling and also has a silk-specific feeling, is provided.

In this connection, these effects are exerted more surely by determining the oil absorption of the silk powder to be 60-100 ml/100 g and the particle diameter on the basis of dispersion degree evaluation with a grind gauge according to JIS K5400 to be 20-70 µm.

In order to obtain a silk powder provided with such average particle diameter, oil absorption and particle diameter based on a grind gauge, it can be prepared only by pulverizing a silk starting material using a publicly known pulverizer. For example, pulverization through a two-step pulverization process including a first and second pulverization processes shown below is preferred.

[The First Pulverization Process]

In the first pulverization process, a starting material for modifying material (silk starting material in this embodiment) is subjected to pulverization treatment using a dry-type mechanical pulverizer. As for the dry-type mechanical pulverizer, publicly known pulverizer can be used, including, for example, various ball mills such as a rolling ball mill, vibratory ball mill and planetary ball mill, a tube mill, a rod mill and a hammer mill for fine pulverization.

In the invention, among them, use of a ball mill is preferred, and use of a rolling ball mill is particularly preferred. Employment of a ball mill as the dry-type mechanical pulverizer can give effectively impact force, compressive force, shear force and the like to silk being a product to be pulverized. Further, employment of a rolling ball mill as the ball mill makes mass production of the silk powder possible and, at the same time, can prevent coloring of the powder and give a fine-granular silk powder suitably.

In the first pulverization process, the pulverization treatment time is determined to be 40 hours or more, preferably 40-70 hours. A pulverization treatment time shorter than 40 hours may give a silk powder having a large oil absorption or particle diameter based of a grind gauge, thereby making it difficult to obtain a silk powder having the values within the desired range (oil absorption: 130 ml/100 g or less, particle diameter based on a grind gauge: 80 μm or less). By employing a pulverization treatment time such as comparatively long 40 hours or more, there occurs change in irregularity, wettability to oil, crystallinity and the like of the surface of a silk starting material to be pulverized, whereby the oil absorption becomes small and can be controlled suitably within the aforementioned range.

Decrease of oil absorption may be realized by prolonging the treatment time (at least 40 hours) of a dry-type mechanical pulverizer such as a ball mill as described. However, when the pulverization treatment time is prolonged too much, the pulverized product having been pulverized may acoagulate to make, inversely, an average particle diameter large, resulting in a large oil absorption and ink viscosity despite the intention. Further, sometimes pulverization property with a jet mill in the second pulverization process degrades. Accordingly, the pulverization treatment time may be around 40-70 hours. The treatment time falling within such range may inhibit change in color of the obtained silk powder (whiteness of 80 or more can be maintained) and also maintain high productivity of the silk powder, and is preferred.

When the treatment time in the first pulverization process is shorter than 40 hours, the obtained silk powder after the end of the second pulverization process often has a particle diameter above 80 μm on the basis of dispersion degree evaluation with a grind gauge. As a result, there occurs such problems that it becomes difficult to incorporate the silk powder to ink or paint in a high concentration or, even if it is incorporated, gritty feeling remains on a surface on which the ink or paint has been coated.

On the other hand, when the time in the first pulverization process is too long, for example more than 70 hours, sometimes pulverized products coagulate to form secondary particles and, despite the intention, the particle diameter based on a grind gauge exceeds 80 μm. While also considering such points, the pulverization treatment time may be around 40-70 hours.

[The Second Pulverization Process]

In the second pulverization process, the pulverized product obtained in the first pulverization process is further subjected to pulverization treatment with a jet mill (also referred to as a jet pulverizer). As for such jet mill, conventionally publicly known jet mills can be used, including a nozzle suction type (vertical type and horizontal type), in-nozzle suction type, impingement plate type, jet stream impingement type, fluidized bed type and composite type.

Such conditions as air pressure, feed rate for a jet mill and wind volume used in the second pulverization process can be determined depending on type of a silk starting material to be pulverized and specification of silk powder to be obtained.

By providing a jet mill used in the second pulverization process with an apparatus having classification performance such as a cyclone or an air current-type classifying device in a closed circuit to classify and remove fine particles having relatively large granularity, it is possible to obtain silk powders having a uniform particle diameter efficiently and to adjust the maximum particle diameter and the average particle diameter to a small value.

Here, it is preferred that, in the first pulverization process, a silk starting material being the object to be pulverized is pulverized to have an average particle diameter of around 12-30 μm. Then, in the second pulverization process, the pulverized product obtained in the first pulverization process is pulverized down to be fine particles having an average particle diameter of approximately 10 μm or less, preferably 8 μm or less to give the silk powder.

Although there is no particular restriction on the maximum particle diameter of the silk powder to be obtained, it is generally around 32 μm or less preferably, and around 24 μm or less more preferably.

When the pulverization treatment is conducted by such two-stage pulverization process, it becomes possible to pulverize a silk starting material to fine particles having an average particle diameter of 10 μm or less, leading to enable the silk powder having a size suitable for utilization as a modifying material to be obtained easily and, in addition, since the pulverization treatment time in the first pulverization process is determined to be 40 hours or more, a silk powder having the oil absorption and particle diameter based on a grind gauge that fall within a desired range (oil absorption: 130 ml/100 g or less, particle diameter based on a grind gauge: 80 μm or less) can be obtained simply and effectively. Further, a silk starting material is pulverized into a granular shape and the obtained silk powder contains those in fibrous shape as little as possible, therefore the silk powder does not easily cause increase in viscosity when incorporated in a solvent-based resin and aqueous resin, and is incorporated easily for various products as a modifying material.

Further, in the first pulverization process, a silk starting material which is the object to be pulverized is subjected to pulverization according to impact, compression and shear with a rolling ball mill and the like and, in the second pulverization process, it is subjected to pulverization according to self-impingement and impingement to a pulverizer wall with a jet mill, therefore a silk powder having a uniform shape and size, which can not obtained through either one pulverization process alone, can be obtained simply. In addition, since a silk starting material is made into fine particles only through a mechanical pulverizer such as a rolling ball mill and a jet mill, necessity for chemical treatment is eliminated, thereby making it possible to maintain original properties of silk (such as feeling), to give a silk powder having a desired shape and size through a simple process, and to reduce production cost. Furthermore, since a rolling ball mill or the like used in the first pulverization process is suitable for pulverization of a product to be pulverized having a relatively large average particle diameter and a jet mill used in the second pulverization process is suitable for a product to be pulverized having a relatively small average particle diameter, by conducting pulverization processes in this order, it becomes possible to conduct pulverization of a silk starting material effectively and to obtain a silk powder having a desired shape and size quickly and easily.

In addition, use of a rolling ball mill and the like in the first pulverization process makes it possible to give sufficient impact force, compressive force and shear force to a product to be pulverized, and use of a jet mill in the second pulverization process makes it possible to prompt impingement among pulverized products and impingement between pulverized products and a jet mill wall sufficiently. According to these, a silk powder having been pulverized in a desired shape and size can be obtained simply and surely.

[β-Modification Treatment]

In the pulverization process, by attempting to conduct β-modification treatment, crystallinity of the silk powder to be obtained betters and oil absorption thereof also decreases. And by making the crystallinity at least 70% of that of natural fiber preferably, it becomes possible, upon production of products, to allow the silk powder to be dispersed uniformly in a solvent-based resin solution, aqueous resin solution and the like. As a result, products excellent in moisture absorbability/releasability, moisture permeability and touch feeling, and further also excellent in antistatic performance can be obtained suitably, while maintaining a silk-specific feeling.

The β-modification treatment is a treatment in which silk fibroin or the like is dipped in a predetermined treatment liquid to increase percentage of β-structure. As for the treatment liquid, an organic solvent or aqueous solution of neutral salt may be used. Specific examples of the organic solvent include alcohols such as methanol and ethanol and acetone, and specific examples of the neutral salt include sodium chloride, potassium chloride, sodium sulfate, ammonium sulfate and sodium nitrate.

The β-modification treatment may be conducted at least once in either of the first pulverization process and the second pulverization process, or after these processes, and may be conducted twice or more if necessary. In particular, it is preferably conducted at the same time during the first pulverization process, or conducted in a point after the first pulverization process and before the second pulverization process.

[Product Form]

The silk powder of the invention can be incorporated in a predetermined liquid base material to be used as a liquid composition. Since the silk powder of the invention has an average particle diameter of 10 μm or less and, at the same time, oil absorption of 130 ml/100 g or less and a particle diameter of 80 μl or less based on a grind gauge, it has good dispersibility for aqueous and solvent-based liquid compositions and can be incorporated in the liquid composition in a high content. As for the liquid composition, for example, paint, ink, surface treatment agents, fiber treatment agents and various types of cosmetic can be mentioned. Content of the silk powder for a liquid base material is not particularly restricted, and such a high content as 40-70 mass % may be possible. For example, when the liquid composition is ink, since it can be incorporated in an ink base material in a high content, provision of an ink excellent in ink-accepted performance and the like can be realized.

In addition, the silk powder of the invention may be incorporated in a resin material and elastomer to form a molded product having a desired shape. Examples of the resin material and elastomer to which the silk powder is incorporated include thermoplastic resin (polyvinyl-based resin such as polyvinyl chloride, polyolefin-series resin such as polypropylene and polyethylene, polystyrene, acrylic resin, polyester-based resin such as polyethylene terephthalate, polyamide-based resin and the like), thermosetting resin (alkyd resin, amino resin, epoxy resin, polyurethane resin, phenol resin and the like), ultraviolet-setting resin such as epoxy-based resin, polyester-based resin and urethane-based resin, and various types of thermoplastic elastomer. As mentioned above, since the silk powder of the invention has a specific average particle diameter and, at the same time, also oil absorption and the like within a specific range, it has good dispersibility also for molded products having a certain shape made of the resin material or elastomer. Thus, the silk powder can be incorporated for the molded product in a content as high as the content for aforementioned liquid base materials.

As for the molded product obtained from these resins or elastomer, for example, synthetic leather, leather, building material, floor material, wall material and the like can be mentioned. There is no particular restriction on a method for obtaining these molded products, and conventionally publicly known molding methods can be used.

Here, the embodiment described above represents one embodiment of the invention and, needless to say, the invention is not restricted to the embodiment but modifications and improvements within a range that can achieve the purpose and effect of the invention are included in the scope of the invention. Further, specific construction, shape and the like upon practice of the invention may be made, without problem, into other construction, shape and the like in a range that can achieve the purpose and effect of the invention.

For example, in the above embodiment, silk fibroin is mentioned, as an example, as a silk starting material which is the object to be pulverized. But it is not an exclusive one, and another silk starting material may be used.

Also, as a dry-type mechanical pulverizer applied in the first pulverization process, publicly known pulverizers are mentioned including various ball mils such as a rolling ball mill, vibratory ball mill and planetary ball mill, a tube mill, a rod mill, a hammer mill for fine pulverization. However it is not restricted to these but other dry-type mechanical pulverizers may be used.

Additionally, specific construction, shape and the like in the practice of the invention may be made into other construction and the like within a range that can achieve the purpose of the invention.

Second Embodiment

The modifying powder in this embodiment is polysaccharide powder obtained by using polysaccharide as a starting material of modifying material and dry-pulverizing the same.

Examples of polysaccharide being the object to be pulverized include cellulose, chitin and chitosan and, particularly, use of cellulose is preferred.

Shape of these polysaccharide is not particularly restricted, but use of polysaccharide in coarse particles is preferred. When polysaccharide in coarse particles is used, an average particle diameter of 20 μm-2 mm is preferred, and 20 μm-500 μm is particularly preferred. An average particle diameter of 20 μm-2 mm makes it possible to practice pulverization treatment simply, and easy to control polysaccharide powder to be obtained to have an average particle diameter of 10 μm or less.

As the polysaccharide powder of the invention, these polysaccharides are pulverized so as to have an average particle diameter of 10 μm or less, preferably 2-8 μm. A polysaccharide powder having an average particle diameter larger than 10 μm may cause irregularity of coating or, when it is used as a surface treatment agent for leather, remaining of gritty feeling of the surface, therefore it becomes unsuitable for an application as a modifying material for ink, paint and the like.

In a first polysaccharide powder of the invention, in addition to the aforementioned average particle diameter, ink viscosity is less than 15 Pa·s, and preferably less than 10 Pa·s. When ink viscosity is 15 Pa·s or more, viscosity of ink, paint and the like containing the polysaccharide powder is high, making it not easy to coat the paint on a body to be coated. Considering utility as paint, it becomes difficult to incorporate the powder to these in a high content.

The ink viscosity of polysaccharide powder can be measured after the content shown in [Test 3] (measurement of ink viscosity) described later.

In a second polysaccharide powder of the invention, in addition to the aforementioned average particle diameter, oil absorption is 85 ml/100 g or less, and preferably 80 ml/100 g or less. When the oil absorption is larger than 85 ml/100 g, similar to the aforementioned case where the ink viscosity is large, viscosity of ink, paint and the like to which the polysaccharide powder has been compounded is high, making it not easy to coat the paint on a body to be coated. Considering utility as paint, it becomes difficult to incorporate the powder to them in a high content.

As for the oil absorption of the polysaccharide powder, for example, a value measured on the basis of JIS K5101 can be used.

In the polysaccharide powder of the invention, since the average particle diameter is determined to be 10 µm or less and, at the same time, the ink viscosity is determined in a specific range of less than 15 Pa·s, or the oil absorption in a specific range of 85 ml/100 g or less, the powder has good dispersibility for resin materials for molding and processing, and for resin solutions to be a base material of liquid composition constituting paint and the like, whereby the polysaccharide powder that may be compounded to these liquid compositions and molded products in a high content can be provided.

Accordingly, even when the polysaccharide powder of the invention is added to various products such as plastic molded products, synthetic leather, paint, ink, fiber, nonwoven fabric, woven or knitted fabric, fiber treatment agents and rubber, while utilizing the characteristics of being excellent in dispersibility, the powder can be incorporated to them in a high content, thereby making it possible to give them efficiently with various properties belonging to the polysaccharide powder such as moisture absorbability/releasability, good touch feeling and antistatic property, and to give products having been improved in these properties simply.

Further, in particular, the polysaccharide powder of the invention is excellent in dispersibility also for an aqueous or solvent-based liquid base material, therefore it enables effects to be exerted maximally when it is applied to these liquid base materials. For example, even when the polysaccharide powder is added to ink, it can be incorporated to a ink base material in a high content, therefore a ink excellent in ink-accepted property is provided.

The polysaccharide powder of the invention has, preferably, ink viscosity of less than 15 Pa·s and oil absorption of 85 ml/100 g or less. The polysaccharide powder having such ink viscosity and oil absorption becomes one having more excellent dispersibility to aqueous and solvent-based resin materials such as ink and paint, and can be incorporated suitably to these in a high content.

A polysaccharide powder with such average particle diameter, oil absorption and ink viscosity can be obtained by pulverizing the aforementioned polysaccharide, which is a starting material, using a publicly known pulverizer. For example, pulverization is preferred to be carried out through a two-stage pulverization process comprising the fist and second pulverization processes represented below.

[The First Pulverization Process]

In the first pulverization process, a starting material for modifying material (in the embodiment, polysaccharide starting material) is subjected to pulverization treatment using a dry-type mechanical pulverizer. As for this dry-type mechanical pulverizer, publicly known pulverizer can be used, including, for example, various ball mills such as a rolling ball mill, vibratory ball mill and planetary ball mill, a tube mill, a rod mill and a hammer mill for fine pulverization.

In the invention, among them, use of a ball mill is preferred, and use of a rolling ball mill is particularly preferred. By employing a ball mill as a dry-type mechanical pulverizer, impact force, compressive force, shear force and the like can be given efficiently to polysaccharide being a product to be pulverized. Further, employment of a rolling ball mill as the ball mill makes mass production of the polysaccharide powder possible and, at the same time, can inhibit coloring of the powder, give the polysaccharide powder in fine particles suitably.

Here, in the first pulverization process, the pulverization treatment time is determined to be 40 hours or more, preferably 60-90 hours. When the pulverization treatment time is shorter than 40 hours, sometimes oil absorption or ink viscosity of the obtained polysaccharide powder becomes large, thereby making it difficult to obtain a polysaccharide powder having the values within a desired range (ink viscosity: less than 15 Pa·s, oil absorption: 85 ml/100 g or less). On the contrary, by employing a pulverization treatment time such as comparatively long 40 hours or more, there occurs change in irregularity, wettability to oil, crystallinity and the like of the surface of a silk starting material to be pulverized, whereby the oil absorption and ink viscosity become small and can be controlled within the aforementioned range.

Decrease in oil absorption and ink viscosity may be realized by prolonging the treatment time (at least 40 hours) through a dry-type mechanical pulverizer such as a ball mill as described. However, when the pulverization treatment time is prolonged too much, the pulverized product having been pulverized may coagulate to make, inversely, an average particle diameter large, resulting in a large oil absorption and ink viscosity despite the intention. Accordingly, the pulverization treatment time may be around 60-90 hours. The treatment time falling within such range may inhibit change in color of the polysaccharide powder to be obtained and also maintain high productivity of the polysaccharide powder, which is preferred.

[The Second Pulverization Process]

In the second pulverization process, the pulverized product obtained in the first pulverization process is further subjected to pulverization treatment with a jet mill (also referred to as a jet pulverizer). As for such jet mill, conventionally publicly known jet mills can be used, including a nozzle suction type (vertical type and horizontal type), in-nozzle suction type, impingement plate type, jet stream impingement type, fluidized bed type and composite type.

Such conditions as air pressure and feed rate, and wind volume for a jet mill used in the second pulverization process can be determined depending on type of polysaccharide to be pulverized and specification of polysaccharide to be obtained.

By providing a jet mill used in the second pulverization process with an apparatus having classification performance such as a cyclone or an air current-type classifying device in a closed circuit to classify and remove fine particles having relatively large granularity, it is possible to obtain silk powders having a uniform particle diameter efficiently and to adjust the maximum particle diameter and the average particle diameter to a small value.

Here, in the first pulverization process, polysaccharide which is the object to be pulverized is pulverized to have an average particle diameter of around 10-20 µm preferably, and around 10-15 µm particularly preferably. Then, in the second pulverization process, the pulverized product obtained in the first pulverization process is pulverized down to be fine particles having an average particle diameter of 10 µm or less.

Although there is no particular restriction on the maximum particle diameter of the polysaccharide powder to be obtained, it is generally around 32 µm or less preferably, and around 24 µm or less more preferably.

When the pulverization treatment is conducted by such two-stage pulverization process, it becomes possible to pulverize polysaccharide to fine particles having an average particle diameter of 10 µm or less, leading to enable the polysaccharide powder having a size suitable for utilization as a modifying material to be obtained easily and, in addition, since the pulverization treatment time in the first pulverization process is determined to be 40 hours or more, polysaccharide powder having the oil absorption and ink viscosity that fall within a desired range (ink viscosity: less than 15 Pa·s, oil absorption: 85 ml/100 g or less) can be obtained simply and effectively. Further, polysaccharide is pulverized into a granular shape and polysaccharide powder to be obtained contains no fibrous one, therefore the polysaccharide powder does not easily cause increase in viscosity when incorporated in a solvent-based resin and aqueous resin, and is incorporated easily for various products as a modifying material.

Further, in the first pulverization process, polysaccharide which is the object to be pulverized is subjected to pulverization according to impact, compression and shear with a rolling ball mill and the like and, in the second pulverization process, it is subjected to pulverization according to self-impingement and impingement to a pulverizer wall, therefore polysaccharide powder having a uniform shape and size, which can not obtained through either one pulverization process alone, can be obtained simply. In addition, since polysaccharide is made into fine particles only through a mechanical pulverization processes such as a rolling ball mill or a jet mill, necessity for chemical treatment is eliminated, thereby making it possible to maintain original properties of polysaccharide, to give polysaccharide powder having a desired shape and size through a simple process, and to reduce production cost. Furthermore, since a rolling ball mill or the like used in the first pulverization process is suitable for pulverizing object having a relatively large average particle diameter and a jet mill used in the second pulverization process is suitable for pulverizing object having a relatively small average particle diameter, by conducting pulverization processes in this order, it becomes possible to conduct pulverization of polysaccharide powder effectively and to obtain polysaccharide powder having a desired shape and size quickly and easily.

In addition, use of a rolling ball mill and the like in the first pulverization process makes it possible to give sufficient impact force, compressive force and shear force to a product to be pulverized, and use of a jet mill in the second pulverization process makes it possible to prompt impingement among pulverized products and impingement between pulverized products and a jet mill wall sufficiently. According to these, polysaccharide powder having been pulverized in a desired shape and size can be obtained simply and surely.

[Product Form]

The polysaccharide powder of the invention can be incorporated in a predetermined liquid base material and can be used as a liquid composition. Since the polysaccharide powder of the invention has an average particle diameter of 10 µm or less and, at the same time, a predetermined ink viscosity (less than 15 Pa·s) and oil absorption (85 ml/100 g or less), viscosity of ink, paint and the like to which the polysaccharide powder has been compounded does not increase, the paint has a good coating properties to a product to be coated, and the powder can be incorporated to liquid base materials such as paint in a high content, which is preferred.

Here, examples of the liquid composition include paint, ink, surface treatment agents, fiber treatment agents and various types of cosmetic. There is no particular restriction on contents of the polysaccharide powder for the liquid base material, and the polysaccharide powder can be compounded in a larger amount compared with conventional polysaccharide powder when it is the same type of liquid base material, thereby giving the base material excellent properties belonging to polysaccharide powder such as moisture absorbability/releasability and writing-accepted property in a state of higher effectiveness.

Further, the polysaccharide powder of the invention can be incorporated to resin materials and elastomer to form a molded product of a desired shape. Here, examples of the resin material and elastomer to which the polysaccharide powder is incorporated include thermoplastic resin (polyvinyl-based resin such as polyvinyl chloride, polyolefin-series resin such as polypropylene and polyethylene, polystyrene, acrylic resin, polyester-based resin such as polyethylene terephthalate, polyamide-based resin and the like), thermosetting resin (alkyd resin, amino resin, epoxy resin, polyurethane resin, phenol resin and the like), ultraviolet-setting resin such as epoxy-based resin, polyester-based resin and urethane-based resin, and various types of thermoplastic elastomer. As mentioned above, since the polysaccharide powder of the invention has a specific average particle diameter and, at the same time, also ink viscosity and oil absorption within a specific range, it has good dispersibility also for molded products having a certain shape made of the resin material or elastomer. Thus, the polysaccharide powder can be incorporated for the molded product in a content as high as the content for aforementioned liquid base materials.

As for the molded product obtained from these resins or elastomer, for example, synthetic leather, leather, building material, floor material, wall material and the like can be mentioned. There is no particular restriction on a method for obtaining these molded products, and conventionally publicly known molding methods may be used.

Here, the embodiment described above represents one embodiment of the invention and, needless to say, the invention is not restricted to the embodiment but modifications and improvements within a range that can achieve the purpose and effect of the invention are included in the scope of the invention. Further, specific construction, shape and the like upon practice of the invention may be made into other construction, shape and the like in a range that can achieve the purpose and effect of the invention without problem.

For example, in the above embodiment, cellulose, chitin or chitosan is mentioned, as an example, as polysaccharide which is the object to be pulverized. But it is not an exclusive one, and other polysaccharide may be used.

Also, as a dry-type mechanical pulverizer applied in the first pulverization process, publicly known pulverizers are mentioned including various ball mils such as a rolling ball mill, vibratory ball mill and planetary ball mill, a tube mill, a rod mill, a hammer mill for fine pulverization. However it is not restricted to these but another dry-type mechanical pulverizer may be used.

Additionally, specific construction, shape and the like in the practice of the invention may be made into other construction and the like within a range that can achieve the purpose of the invention.

EXAMPLES

Hereinafter, Examples and Comparative examples will be represented to describe the present invention more specifically. But the invention is not intended to be restricted to the content of Examples and the like.

The following Example 1-Example 6 relate to the silk powder based on the aforementioned first embodiment.

Example 1

Production of Silk Powder (1)

(1) The First Pulverization Process with a Ball Mill:

Starting raw silk was dipped in hot water to remove sericin completely and form raw silk of silk fibroin. The raw silk of silk fibroin was made into short fibers having an average fiber length of about 2 mm with a cutter blade-type mill (VM-32: produced by ORIENT CO., LTD.).

70 kg of the silk fibroin in short fiber was used as a silk starting material to obtain a pulverized product of silk fibroin by using a rolling ball mill (produced by MAKINO CORPORATION, capacity: 2.2 m$^3$) which was a dry-type mechanical pulverizer while determining the ball amount to be 1.2 t and the pulverization treatment time to be 48 hours. The used ball was made of ceramics.

(2) β-Modification Treatment Process:

The pulverized product of silk fibroin obtained in (1) was charged in a 200 ml stainless vessel, in which methanol was poured. The pulverized product was dipped in methanol at room temperature for 1 hour to conduct β-modification treatment of the pulverized product. After the β-modification treatment, the pulverized product of silk fibroin was taken out of the vessel and dried.

(3) The Second Pulverization Process with a Jet Mill:

The pulverized product of silk fibroin having been subjected to the β-modification treatment in (2) was subjected to pulverization treatment using a jet mill (single track jet mill: produced by SEISHIN ENTERPRISE CO., LTD.) under such conditions as air pressure of 0.7 MPa, feed rate of 2 kg/hr and wind volume of 2.8 m$^3$/min to give the silk powder (silk fibroin powder) of the invention.

Example 2

Production of Silk Powder (2)

The silk powder (silk fibroin powder) of the invention was obtained using the same method as in Example 1, except that the (2) β-modification treatment was not conducted.

Example 3

Production of Silk Powder (3)

The silk powder (silk fibroin powder) of the invention was obtained using the same method as in Example 1, except that the pulverization treatment time in the first pulverization process was changed from 48 hours to 80 hours. Here, slight coloring was recognized for the obtained silk powder.

Comparative Example 1

Production of Silk Powder (4)

Silk powder (silk fibroin powder) was obtained using the same method as in Example 1, except for changing the pulverization treatment time in the first pulverization process from 48 hours to 30 hours and the feed rate from 2 kg/hr to 1 kg/hr.

Table 1 shows production conditions for the two pulverization processes in these Examples 1-3 and Comparative example 1.

(Production Conditions)

TABLE 1

| Pulverization process etc. | Specification | Unit | Example 1 | Example 2 | Example 3 | Comparative example 1 |
|---|---|---|---|---|---|---|
| First pulverization process (ball mill) | Mill volume | m$^3$ | 2.2 | 2.2 | 2.2 | 2.2 |
| | Ball amount | t | 1.2 | 1.2 | 1.2 | 1.2 |
| | Pulverization treatment time | hour | 48 | 48 | 80 | 30 |
| β-modification treatment | Treatment time | hour | 1 | none | 1 | 1 |
| Second pulverization process (jet mill) | Air pressure | Mpa | 0.7 | 0.7 | 0.7 | 0.7 |
| | Feed rate | kg/hr | 2 | 2 | 2 | 1 |
| | Wind volume | m$^3$/min | 2.8 | 2.8 | 2.8 | 2.8 |

[Test 1]

Particle diameter, bulk density, oil absorption and particle diameter based on a grind gauge were measured for each of the silk powders obtained in the Examples and Comparative example, which were compared and evaluated. The results are shown in Table 2.

(Measurement of Particle Diameter)

A laser diffraction type particle size analyzer (SK LASER-PRO 7000S: produced by SEISHIN ENTERPRISE CO., LTD., dispersion medium: ethanol, dispersion condition: super sound 60 seconds) was used to measure the maximum particle diameter and average particle diameter.

(Measurement of Bulk Density)

A multi-tester (MT-100; produced by SEISHIN ENTERPRISE CO., LTD.) was used to measure tap density while determining tap number to be 500, which was defined as bulk density.

(Measurement of Oil Absorption)

Measurement was conducted according to JIS K5101. That is, each 5 g of the silk powders obtained in Examples and Comparative example was measured off and charged in a 100 ml vessel, to which linseed oil was dropped with a pipette up to 4-5 drops to the center portion of the silk powder while kneading the whole sufficiently with a metal spatula after the addition.

Such dropping-kneading was repeated, and when the whole became putty, linseed oil was added drop by drop. The end point was determined when the kneading state of the surface became a state where a spiral was drawn (the state where gloss was generated on the surface), and the total volume of dropped linseed oil (ml) was measured.

Then, the amount of dropped linseed oil was converted into an amount per 100 g of the silk powder, which was defined as oil absorption.

(Measurement of Particle Diameter Based on a Grind Gauge)

According to JIS K5400, dispersion degree evaluation based on a grind gauge was conducted to measure particle diameter.

(Measurement Results)

TABLE 2

| Item | | Unit | Example 1 | Example 2 | Example 3 | Comparative example 1 |
|---|---|---|---|---|---|---|
| Particle diameter | Average diameter | μm | 5.6 | 6.2 | 5.8 | 6.8 |
| | Maximum diameter | μm | 32 | 32 | 32 | 77 |
| Bulk density | Tap density | g/ml | 0.50 | 0.48 | 0.52 | 0.41 |
| | Oil absorption | ml/100 g | 89 | 128 | 85 | 170 |
| Particle diameter based on a grind guage | | μm | 45 | 40 | 42 | >100 (Note) |

(Note) There exist a lot of fibrous products having a fiber length of 100 μm.

As can be seen from the results listed in Table 2, the respective silk powders obtained in Examples 1-3, where the pulverization time with a ball mill in the first pulverization process was 40 hours or more, had an average particle diameter of 10 μm or less, and an oil absorption of 130 ml/100 g or less. In addition, the particle diameter based on a grind gauge was 80 μm or less, too.

Thus, the silk powders obtained in Examples 1-3 have such properties in the oil absorption and particle diameter based on a grind gauge, as well as the average particle diameter and, therefore, are excellent in dispersibility for resin materials for molding and processing and resin solutions to be a base material of liquid composition constituting paint and the like, and can be incorporated in a high content.

In this connection, comparison of Example 1, in which the β-modification treatment was conducted after the first pulverization process, with Example 2, in which no β-modification treatment was conducted, revealed that the oil absorption of the silk powder obtained in Example 1 was smaller (89 ml/100 g), and we could confirm that practice of the β-modification treatment improved crystallinity to control the oil absorption to be a small value.

Further, the silk powder obtained in Example 3, in which the pulverization treatment time after the first pulverization process was determined to be 80 hours and the β-modification treatment was conducted after the first pulverization process, when compared with those obtained in Examples 1 and 2, had a small oil absorption and the particle diameter based on a grind gauge with a little difference, although it had an appearance with slight color.

On the other hand, the silk powder obtained in Comparative example 1, in which the treatment time in the first pulverization process was shorter than 40 hours, had an average particle diameter of 10 μm or less, however the oil absorption was larger than 130 ml/100 g (170 ml/100 g) and some grains were fibrous to give the particle diameter of 100 μm based on a grind gauge. Accordingly, for example, if it is added to an aqueous or solvent-based resin material and the like, since the dispersibility is not good, difficulty of incorporation in a high content is expected.

Incidentally, when a resin composition containing the silk powder of the present invention is formed into a film by coating, in order to prevent foaming phenomenon (a defective phenomenon) from occurrence, water content is preferred to be adjusted.

Example 4

Film-Forming a Composition Containing Silk Powder by Coating (1)

The water content of the silk powder of the aforesaid Example 1 was 7.5 wt %. The silk powder of the Example 1 was adjusted to 1.0 wt % by a vibration vacuum fluidized drier (in a vacuum condition at 120° C. for 150 minutes). Incidentally, the water content was measured by an infrared moisture meter at 150° C. for 20 minutes.

A paste-like PVC compound was obtained by agitating the composition of formula 1 of the following Table 3 with a dispersing agitator for 15 minutes. The obtained PVC compound was pressure filtered with a mesh having sieve opening of 150 μm, and then treated by a vacuum defoaming machine to deaerate the foams in the system.

The deaerated PVC compound was coated on a release paper by a knife coater, then gelated in a heating furnace at 150° C. and the gelated compound is melted in a heating furnace at 190° C. to be formed into a 200 μm thick film of PVC containing silk powder.

Example 5

Film-Forming a Composition Containing Silk Powder by Coating (2)

A film of PVC containing silk powder was obtained by the method identical to the Example 4 except that the composition of formula 2 of the following Table 3 was used.

The composition of formula 1 and formula 2 respectively used in Example 4 and Example 5 are indicated in Table 3.

TABLE 3

| | Formula 1 Blended with 10 wt % powder | Formula 2 Blended with 5 wt % powder |
|---|---|---|
| PVC for paste | 100 | 100 |
| Plasticizer DIDP | 85 | 85 |
| Powder | 22 | 10 |
| Pigment paste | 5 | 5 |

Example 6

Film-Forming a Composition Containing Silk Powder by Coating (3)

A film of PVC containing silk powder was obtained by the method identical to the Example 5 except that the water content of the silk powder was adjusted to 2.7 wt %.

Reference Example 1

Film-Forming a Composition Containing Silk Powder by Coating (4)

A film of PVC containing silk powder was obtained by the method identical to the Example 5 except that the water content of the silk powder was the same value as the Example 1 (7.5 wt %).

[Test 2]

The evaluation on presence/absence of foaming was conducted to the films of PVC containing silk powder obtained in the Example 4 to 6 and the Reference Example 1. Incidentally, the evaluation was conducted by observing the number of the foam contained in the film through a loupe when the 200 μm thick film was heated and stretched and a light was transmitted from the reverse side of the film. The results are shown in Table 4.

TABLE 4

| | Example 4 | Example 5 | Example 6 | Reference Example 1 |
|---|---|---|---|---|
| Water content of powder | 1 wt % | 1 wt % | 2.7 wt % | 7.5 wt % |
| Blending quantity of powder | 10 wt % | 5 wt % | 5 wt % | 5 wt % |
| Presence/absence of foam | Few | Very few | Few | Many big foams exist and lack in practicality |

The following Example 7-Example 8 relate to the polysaccharide powder on the basis of the aforementioned second embodiment.

Example 7

Production of Polysaccharide Powder (1)

(1) The First Pulverization Process:

150 kg of cellulose (purified pulp) (KC Flock W-400: produced by Nippon Paper Industries Co., Ltd., average particle diameter: 25 μm) as a polysaccharide starting material was pulverized using a rolling ball mill (produced by MAKINO CORPORATION, capacity 2.2 m³), which is a dry-type mechanical pulverizer, while determining the ball amount to be 1.2 t and the pulverization treatment time to be 60 hours to give the pulverized product of polysaccharide (cellulose).

(2) Second Pulverization Process:

The pulverized product obtained in (1) was subjected to pulverization treatment using a jet mill (STJ-200: produced by SEISHIN ENTERPRISE CO., LTD.) under such conditions as air pressure of 0.7 MPa and feed rate of 2.0 kg/hr to give the polysaccharide powder (cellulose powder) of the invention.

Example 8

Production of Polysaccharide Powder (2)

The polysaccharide powder of the invention was obtained using the same method as in Example 7, except for changing the pulverization treatment time in the first pulverization process from 60 hours to 80 hours.

Comparative Example 2

Production of Polysaccharide Powder (3)

The polysaccharide powder was obtained using the same method as in Example 7, except for changing the pulverization treatment time in the first pulverization process from 60 hours to 20 hours and the feed rate from 2.0 kg/hr to 1.4 kg/hr.

Comparative Example 3

Production of Polysaccharide Powder (4)

A polysaccharide powder was obtained using the same method as in Example 7, except for changing the pulverization treatment time in the first pulverization process from 60 hours to 40 hours and the feed rate from 2.0 kg/hr to 1.0 kg/hr.

Table 5 shows production conditions of the two pulverization processes in Example 7, Example 8, Comparative examples 2, and Comparative example 3.

(Production Conditions)

TABLE 5

| | | | Example | | Comp. Example | |
|---|---|---|---|---|---|---|
| Pulverization process | Specification | Unit | 4 | 5 | 2 | 3 |
| First pulverization process (ball mill) | Mill volume | m³ | 2.2 | 2.2 | 2.2 | 2.2 |
| | Ball amount | t | 1.2 | 1.2 | 1.2 | 1.2 |
| | Pulverization treatment time | hour | 60 | 80 | 20 | 40 |
| Second pulverization process (jet mill) | Air pressure | MPa | 0.7 | 0.7 | 0.7 | 0.7 |
| | Feed rate | kg/hr | 2.0 | 2.0 | 1.4 | 1.0 |

* Cellulose (purified pulp, KC Flock W-400: produced by Nippon Paper Industries Co., Ltd.), which is polysaccharide to be pulverized, has an average diameter of 25 μm. 150 kg was thrown in both Examples and Comp. Examples.

[Test 3]

Particle diameter, bulk density, oil absorption and ink viscosity were measured for each of the polysaccharide powders obtained in the aforementioned Examples and Comparative examples with the following methods, and were compared and evaluated. The results are shown in Table 6.

(Measurement of Particle Diameter)

A laser diffraction type particle size analyzer (SK LASER-PRO 7000S: produced by SEISHIN ENTERPRISE CO., LTD., dispersion medium: ethanol, dispersion condition: super sound 60 seconds) was used to measure the maximum particle diameter and average particle diameter.

(Measurement of Bulk Density)

A multi-tester MT-100 (produced by SEISHIN ENTERPRISE CO., LTD.) was used to measure tap density of polysaccharide powder while determining tap number to be 500, which was defined as bulk density.

(Measurement of Oil Absorption)

Measurement was conducted according to JIS K5101. That is, each 5 g of the polysaccharide powders obtained in Examples and Comparative examples was measured off and charged in a 100 ml vessel, to which linseed oil was dropped with a pipette up to 4-5 drops to the center portion of the silk powder while kneading the whole sufficiently with a metal spatula after the addition.

Such dropping-kneading was repeated, and when the whole became putty, linseed oil was added drop by drop. The end point was determined when the kneading state of the surface became a state where a spiral was drawn (the state where gloss was generated on the surface), and the total volume of dropped linseed oil (ml) was measured.

Then, the amount of dropped linseed oil was converted into an amount per 100 g of the polysaccharide powder, which was defined as oil absorption.

(Measurement of Ink Viscosity)

(1) Preparation of Measurement Sample:

After stirring, 93 g of a UV-setting ink base was measured off and charged in a 200 ml beaker. While stirring the ink base in the beaker, each 57 g of the polysaccharide powders obtained in Examples and Comparative examples was thrown into the beaker gradually to prepare respective 150 g of dispersion liquids of the polysaccharide powder.

Subsequently, the dispersion liquid was stirred using a commercially available stirrer with a rotation number of 600-800 rpm at least 3 minutes. After confirming that no polysaccharide powder remained on the bottom or edge of the beaker, the beaker was capped with wrapping film. The dispersion liquid was left at rest in a bath controlled at 25° C. for 15 minutes to prepare a measurement sample.

(2) Viscosity Measurement:

(A) 120 g of the measurement sample prepared in (1) above was charged in a 100 ml vessel and set to a B type viscometer (using a No. 5 rotor, rotation number: 20 rpm).

First, the rotor of the B type viscosity was rotated, the lock of cramp was released, and then it was stabilized for 1 minute. After 1-minute lapse, the cramp was locked to stop rotation, and the numerical value was checked.

(B) The lock of the cramp was released and, after 5 seconds, the rotor was rotated again (rotation number: 20 rpm). 25 seconds after the start of rotation of the rotor, the cramp was locked to stop rotation and the numerical value [mPa·s] at the instant was checked.

The operation (B) was repeated 5 times, and stability of the numerical values was checked. For respective numerical values (referred to as numerical value X [mPa·s]) checked in respective 5 repetitions, viscosity [mPa·s] was calculated according to the following formula.

ink viscosity[mPa·s]=20000×(numerical value X[mPa·s])/100

Then, after calculating the average value for 5 repetitions, it was converted (dividing by 1000) so that unit became [Pa·s], which was defined as ink viscosity [Pa·s].

(Measurement Results)

TABLE 6

| | | | Example | | Comp. Example | |
|---|---|---|---|---|---|---|
| Item | | Unit | 4 | 5 | 2 | 3 |
| Particle size | Average prticle size | μm | 6.3 | 5.8 | 5.6 | 5.4 |

TABLE 6-continued

| | | | Example | | Comp. Example | |
|---|---|---|---|---|---|---|
| Item | | Unit | 4 | 5 | 2 | 3 |
| | Maximum prticle size | μm | 32 | 32 | 32 | 32 |
| Bulk density | Tap density | g/ml | 0.63 | 0.59 | 0.56 | 0.56 |
| | Oil absorption | ml/100 g | 77 | 75 | 89 | 86 |
| | Ink viscosity | Pa·s | 8.9 | 7.8 | 19.9 | 15.0 |

As can be seen from the results listed in Table 6, the respective polysaccharide powders obtained in Example 7 and Example 8, where the pulverization time with a ball mill in the first pulverization process was 40 hours or more, had an average particle diameter of 10 μm or less, and a small oil absorption and ink viscosity such as 85 ml/100 g or less and less than 15 Pa·s, respectively. Since the polysaccharide powders obtained in Example 7 and Example 8 have such properties in the oil absorption and ink viscosity, as well as the average particle diameter, they are excellent in dispersibility for resin materials for molding and processing and resin solutions to be a base material for a liquid composition constituting paint and the like, and can be incorporated in a high content.

On the contrary, the respective polysaccharide powders obtained in Comparative example 3 and Comparative example 4 in which the treatment time in the first pulverization process is shorter than 40 hours had a large oil absorption and ink viscosity, although it had an average particle diameter of 10 μm or less. Accordingly, if it is added to an aqueous or solvent-based resin material and the like, since the dispersibility is not good, difficulty of incorporation in a high content is expected.

INDUSTRIAL APPLICABILITY

The modifying powder of the invention can be used advantageously in various fields such as a car interior component field such as seat cloth and interior paint for a car, a furniture component field such as cloth and exterior paint for sofas and chairs, IT (abbreviation of Information Technology) medium field such as surface ink for DVD (abbreviation of Digital Video Disc) and media for ink jet printers, and a fiber field such as a treatment agent for synthetic and natural fibers.

The invention claimed is:

1. Modifying powder obtained by dry-pulverizing a starting material for modifying material, wherein:

the starting material for modifying material is a silk starting material, and the modifying powder has an average particle diameter of 10 μm or less, oil absorption of 130 ml/100 g or less and particle diameter of 80 μm or less on the basis of dispersion degree evaluation with a grind gauge according to JIS K5400.

2. The modifying powder according to claim 1, wherein the silk starting material is silk fibroin.

3. The modifying powder according to claim 1, wherein:

the oil absorption is 60-100 ml/100 g, and the particle diameter on the basis of dispersion degree evaluation with a grind gauge according to JIS K5400 is 20-70 μm.

4. Modifying powder obtained by dry-pulverizing a staring material for modifying material, wherein the starting material for modifying material is polysaccharide, and the modifying powder has an average particle diameter of 10 μm or less and ink viscosity of less than 15 Pa·s.

5. Modifying powder obtained by pulverizing a starting material for modifying material, wherein the starting material for modifying material is polysaccharide, and the modifying powder has an average particle diameter of 10 μm or less and oil absorption of 85 ml/100 g or less.

6. The modifying powder according to claim 4, wherein the ink viscosity is less than 15 Pa·s and the oil absorption is 85 ml/100 g or less.

7. The modifying powder according to claim 4, wherein the polysaccharide comprises cellulose.

8. A liquid composition comprising modifying powder obtained by dry-pulverizing a starting material for modifying material, wherein:
the starting material for modifying material is a silk starting material, and the modifying powder has an average particle diameter of 10 μm or less, oil absorption of 130 ml/100 g or less and particle diameter of 80 μm or less on the basis of dispersion degree evaluation with a grind gauge according to JIS K5400.

9. A molded product comprising a resin material and/or elastomer containing modifying powder obtained by dry-pulverizing a starting material for modifying material, wherein:
the starting material for modifying material is a silk starting material, and the modifying powder has an average particle diameter of 10 μm or less, oil absorption of 130 ml/100 g or less and particle diameter of 80 μm or less on the basis of dispersion degree evaluation with a grind gauge according to JIS K5400.

10. A method for producing modifying powder wherein the modifying powder is obtained by pulverizing a starting material for modifying material, comprising:
a first pulverization process for pulverizing the starting material for modifying material using a ball mill to obtain a pulverized product, the starting material being a silk starting material; and
a second pulverization process for pulverizing the pulverized product obtained in the first pulverization process with a jet mill to fine particles having an average particle diameter of 10 μm or less,
wherein pulverization treatment time in the first pulverization process is 40-70 hours.

11. The method for producing modifying powder according to claim 10, wherein the silk starting material to be pulverized has an average particle diameter or an average fiber length of 100 μm-5 mm.

12. The method for producing modifying powder according to claim 11, wherein β-modification treatment is conducted during the first pulverization process and/or in a point after the first pulverization process and before the second pulverization process.

13. A method for producing modifying powder wherein the modifying powder is obtained by pulverizing a starting material for modifying material comprising:
a first pulverization process for pulverizing the starting material for modifying material using a ball mill to obtain a pulverized product, the starting material being a polysaccharide; and
a second pulverization process for pulverizing the pulverized product obtained in the first pulverization process with a jet mill to fine particles having an average particle diameter of 10 μm or less,
wherein pulverization treatment time in the first pulverization process is 60 hours or more and 90 hours or less,
and the polysaccharide to be pulverized has an average particle diameter of 20 μm-2 mm.

14. The modifying powder according to claim 5, wherein the ink viscosity is less than 15 Pa·s and the oil absorption is 85 ml/100 g or less.

15. The modifying powder according to claim 5, wherein the polysaccharide comprises cellulose.

16. A liquid composition comprising modifying powder obtained by dry-pulverizing a starting material for modifying material, wherein the starting material for modifying material is polysaccharide, and the modifying powder has an average particle diameter of 10 μm or less and ink viscosity of less than 15 Pa·s.

17. A liquid composition comprising modifying powder obtained by pulverizing a starting material for modifying material, wherein the starting material for modifying material is polysaccharide, and the modifying powder has an average particle diameter of 10 μm or less and oil absorption of 85 ml/100 g or less.

18. A molded product comprising a resin material and/or elastomer containing modifying powder obtained by dry-pulverizing a staring material for modifying material, wherein the starting material for modifying material is polysaccharide, and the modifying powder has an average particle diameter of 10 μm or less and ink viscosity of less than 15 Pa·s.

19. A molded product comprising a resin material and/or elastomer containing modifying powder obtained by pulverizing a starting material for modifying material, wherein the starting material for modifying material is polysaccharide, and the modifying powder has an average particle diameter of 10 μm or less and oil absorption of 85 ml/100 g or less.

* * * * *